Figures 1, 2:
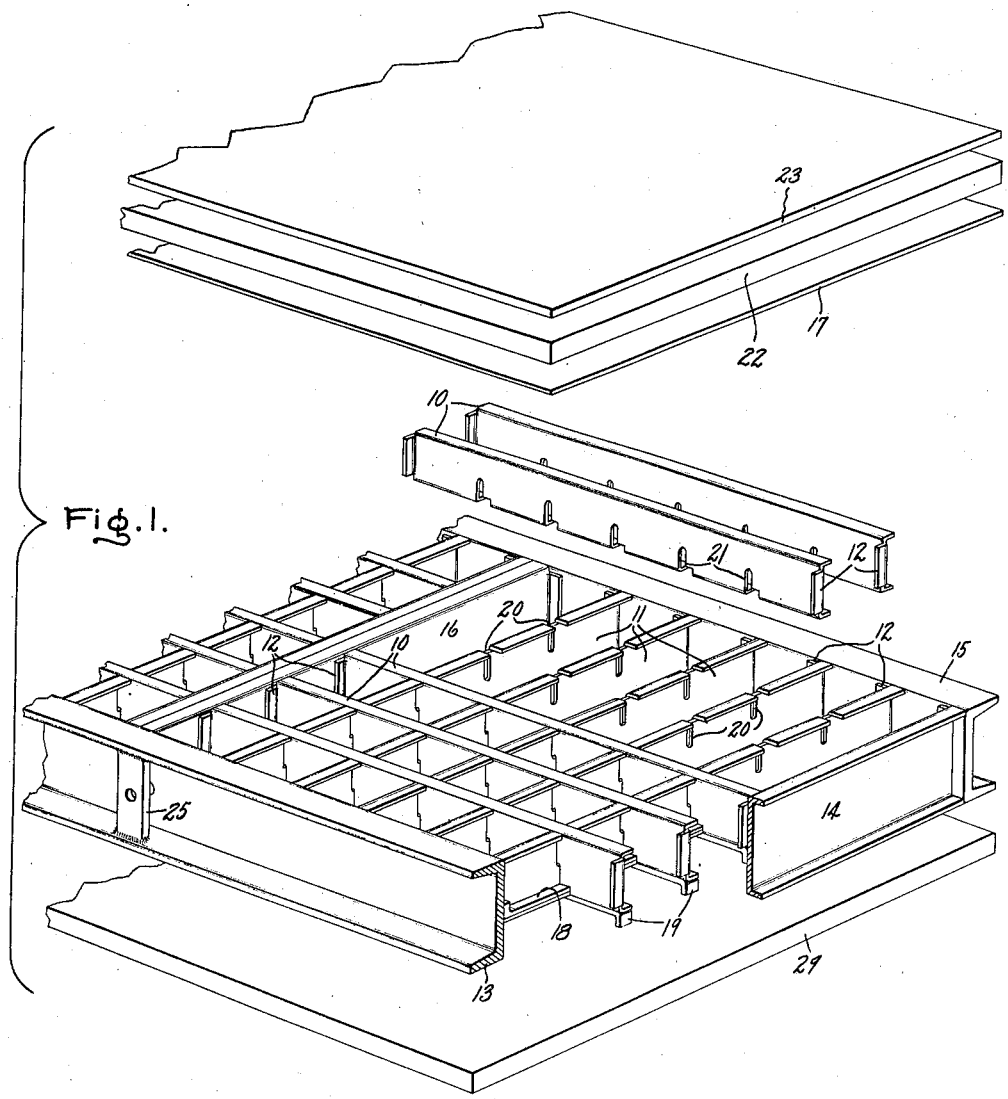

Sept. 1, 1936.  W. DALTON  2,053,135

FABRICATED SLAB

Filed Oct. 25, 1935

Inventor:
William Dalton,
by Harry E. Dunham
His Attorney.

Patented Sept. 1, 1936

2,053,135

UNITED STATES PATENT OFFICE 2,053,135

FABRICATED SLAB

William Dalton, Schenectady, N. Y., assignor to General Electric Company, a corporation of New York Application October 25, 1935, Serial No. 46,656

11 Claims. (Cl. 189—34)

My invention relates to fabricated slabs of lightweight and great strength.

It is an object of my invention to provide a slab which is capable of withstanding the application of concentrating loads by reason of the arrangement and connection of the parts of which it is formed.

It is a further object of my invention to provide a fabricated slab, the interior of which is accessible not only for making connections with other slabs or structures of which it forms a part but also for making periodic applications of protective coatings to its interior portions for preventing corrosion and deterioration thereof.

It is a further object of my invention to provide a cellular structure formed of thin metallic parts reinforced by surface coverings and by bars to produce a lightweight member of sufficient strength for its intended purpose.

Other objects of my invention will become apparent from the following description.

The slab forming the subject matter of my invention is particularly suited for use as a floor structure in houses, bridges, railroad cars, ships, airplanes and the like, and may also be used for the ends of freight cars, the hatch covers of ships, the wings and fuselage of airplanes, and for containers where a lightweight structure of great strength is desired.

In the drawing my invention has been illustrated as embodied in a floor slab suitable for use in pre-fabricated houses.

Fig. 1 shows an exploded view of such a slab in which the arrangement of parts is illustrated, and Fig. 2 is a sectional view through the joint between two slabs illustrating the manner of connecting them to form the floor and ceiling of a house.

The slab illustrated in the drawing comprises transverse groups of notched channels 10 and 11 intersecting one another at said notches to form a cellular structure in which the channel flanges lie in planes spaced from one another by the width of the webs of said channels. The ends of the channels 10 and 11 are turned over to form flanges 12 which are connected to the inside surfaces of beams 13, 14, 15 and 16. The ends of these beams are joined together and form a frame within which the cellular structure of intersecting channels 10 and 11 is located with the channel flanges lying in one plane of the cellular structure coinciding with or substantially in the plane of one of the side surfaces of the frame. A cover sheet 17 is attached to the side surface of the frame above referred to and to the channel flanges in the plane coinciding with or substantially in the plane of said surface. Transverse groups of bars 18 and 19 are attached to the inside surfaces of the frame and to the inside and outside surfaces, respectively, of the transverse groups of channel flanges in the plane spaced from the cover sheet by the width of the channel webs. The ends of bars 18 and 19 are turned over to form flanges which are connected to the inside surfaces of the beams forming the frame. One group of bars 18 is arranged along the inside surfaces of the channel flanges extending in one direction and the other group of bars 19 is arranged along the outside surfaces of the channel flanges extending in a transverse direction. It will be noted that these transverse groups of bars are spaced from one another by the thickness of the channel flanges to the opposite sides of which they are connected.

The notches 20 in the channels 11 are suitably shaped to accommodate the flanges and portions of the webs of the channels 10. The notches 21 in the channels 10 are likewise shaped to accommodate the flanges and parts of the webs of channels 11. Notches 21 also provide a passageway for the group of bars 18 attached to the inside surfaces of the lower flanges of channels 11. The channels 10 and 11 may be formed of pieces cut from metallic sheets. These pieces are notched and then flanged to provide channels of the construction above described.

Preferably the cover sheet 17 and the transverse bars 18 and 19 are joined to the flanges of the channels 10 and 11 throughout their lengths. The plate 17 and transverse bars 19 thus bridge the notches in the channels and constitute the compression and tension portions of these members. The edges of the sheet 17 are joined to the beams 13, 14, 15 and 16 preferably throughout the lengths of these beams and, consequently, in combination with the transverse bars 18 and 19 join the several members of the slab into an integral structure. I prefer to join the parts of the slab by welding. The flanges of the channels and turned up end portions of the channels and cross bars are admirably suited for this purpose. It is, of course, apparent that other means may be provided for attaching these members to one another.

Cemented or otherwise attached to the cover sheet 17 is a cover sheet 22 which may be of fibre board or a sheet of similar composition. Attached to sheet 22 by cement or similar means is the wearing surface 23 of the floor. By reason of the attachment between the plate 17, sheet 22, and wearing surface 23 the three members act as a unit, and in a floor slab such as illustrated constitute the compression member of the slab. In such a slab the transverse bars 18 and 19 constitute the tension members of the slab. It is, of course, apparent that the intersecting channels 10 and 11 need only be of sufficient size to act as web members for the transmission in shear of the compressive forces in 17, 22 and 23, which act as a unit, to the tension members 18 and 19. It is also apparent that the channels 10 and 11 may be made of sufficient size so that their flanges when unnotched will assume the compression and tension stresses of the structure. When such a construction is resorted to the plate and one group of bars bridging the notched portions of the channels will assume the compressive and tensile forces present in the slab at the notches.

The channels 10 and 11 may intersect one another according to any desired pattern but I prefer to have these members equally spaced from one another and intersect one another at right angles. The depth of the channels 10 and 11 will, of course, depend upon the stresses in the slab and the desired spacing of the tension and compression portions thereof. Generally the lower flanged edges of the channels 10 and 11 will be in a plane located within the frame in which the cellular structure formed by the channels 10 and 11 is located.

In a construction such as illustrated and described above, the forces resulting from concentrated loads will distribute themselves uniformly in all directions throughout the slab. This ability to withstand the application of concentrated loads is a direct result of the location and inter-connection of the several members of which the slab is formed. The weight of the slab is greatly reduced by using a thin cover sheet 17. This construction is made possible by integrally attaching to the cover sheet 17 members 22 and 23, forming part of the floor surface. Members 17, 22 and 23, as has been pointed out above, act as an integral member in the floor slab.

Slabs such as illustrated in the drawing may be made of any desired length and width. By connecting slabs to one another as illustrated in Fig. 2, floor surfaces of any desired area may be provided. As shown in Fig. 2 the beams 13 and 15' of adjacent slabs are connected by bolts 24, which extend through bars 25 and 26 attached at their ends to the flanges of beams 13 and 15'. This construction subjects the shanks of the bolts 24 to shear forces. It is, of course, apparent that any desired connections may be made between the frame beams of the slabs.

Socket members 27 may be clamped between the lower flanges of the beams 13 and 15' and ceiling surfaces 28 and 29 held in engagement with the lower surfaces of the slabs by wall trims 30 which are snapped into sockets 27. Although a snap on molding has been shown, it is apparent that any suitable fastening means may be employed for attaching the ceiling members 28 and 29 to the undersides of the floor slabs.

By resorting to the construction illustrated and described above, it is apparent that members 28 and 29 may be readily removed for applying surface coatings to the interior portions of the fabricated slabs. Also in assembling a construction embodying such slabs, the bolts 24 or similar fastening means can readily be applied before the cover members 28 and 29 are added to complete the structure.

The sizes and shapes of the beams 13, 14, 15 and 16 will vary depending upon the requirements of the structure of which they form a part. Generally the beams 13 and 15 will constitute the main beams of a structure in which beams 14 and 16 and the like are the cross beams. Several slabs may be formed into an integral structure as illustrated in the drawing where beams 13 and 15 form the opposite sides of several interconnected slabs. When employing such a construction the cover sheet 17 may be of the same length as the beams 13 and 15 and form the surface of several connected slabs. The cover sheets 22 and 23 attached to the sheets 17 are not limited in size to the size of an individual slab but may be of sufficient size to cover several slabs and extend from one slab to another. The cellular structure as well as the frame in which it is supported, the cover sheet and the bars 18 and 19 are preferably formed of metal, although other materials may be used.

It is, of course, apparent that instead of using channel members as in the particular construction above described T members, angles and other members having a single flange may be used. Such members would be slotted and connected to form a cellular structure in which their flanged portions would lie in a plane spaced from the cover sheet which would be attached to the webs of these members on their unflanged side. Bars which bridge the slots in the flanged portions of these members or which are substantially the same lengths as these members would be employed in the manner described above to strengthen the slotted members or reinforce their flanged portions. It is also apparent that the cover plate of the slab need not lie in the same plane as one of the side surfaces of the frame. The intersecting members of the cellular structure may be spaced a slight distance from this plane so that the cover sheet would be positioned within the frame either flushed with or slightly below the plane of one of the side surfaces of the frame.

In view of the above description of my invention other arrangements will suggest themselves to those skilled in the art. I intend, consequently, to cover in the appended claims all such modifications and variations as fall within the true spirit and scope of my invention.

What I claim as new and desire to secure by Letters Patent of the United States, is:

1. A slab comprising a sheet attached to transverse groups of flanged members notched and intersecting one another at said notches to form a cellular structure in which flanged portions of said members lie in substantially a common plane spaced from said sheet, the notched flanged portions of said members in said plane being reinforced by bars attached to said notched flanged portions and bridging the notches therein.

2. A slab comprising a sheet attached throughout its length and breadth to transverse groups of flanged members notched and intersecting one another at said notches to form a cellular structure in which flanged portions of said members lie in substantially a common plane spaced from said sheet, the flanged portions of said members in said plane being reinforced by transverse groups of bars of substantially the same lengths as the members to the flanges of which they are attached throughout their lengths.

3. A slab comprising transverse groups of notched channels intersecting one another at said notches to form a cellular structure in which the channel flanges lie in planes spaced from one another by the width of the webs of said channels, a cover sheet attached to the channel flanges in one of said planes, and bars attached to and bridging the notches in the notched channel flanges in the other of said planes.

4. A slab comprising transverse groups of notched channels intersecting one another at said notches to form a cellular structure in which the channel flanges lie in planes spaced from one another by the width of the webs of said channels, a cover sheet attached to the channel flanges in one of said planes and transverse groups of bars extending along and attached to the channel flanges in the other of said planes.

5. A slab comprising notched channels intersecting one another at said notches to form a cellular structure in which the channel flanges lie in spaced planes, the outside surfaces of the channel flanges in one plane being connected to a cover sheet and the outside surfaces of the flanges extending in one direction in the other plane being connected to bars extending along said flanges and arranged transversely to bars connected to and extending along the inside surfaces of intersecting flanges in said other plane.

6. A slab comprising a sheet attached throughout its length and breadth to transverse groups of flanged members notched and intersecting one another at said notches to form a cellular structure in which flanged portions of said members lie in substantially a common plane spaced from said sheet, said members being reinforced by transverse groups of bars attached throughout their lengths to and separated by the flanged portions of said members in said plane, one group of bars being disposed along the inside surfaces of the flanges extending in one direction, another group of bars being arranged along the outside surfaces of the flanges extending in a transverse direction, and all of said bars being of substantially the same lengths as the channel flanges to which they are attached.

7. A slab comprising a frame, a cellular structure of transverse groups of intersecting flanged members the ends of which are attached to the inside surfaces of said frame and the flanged portions of which lie in substantially a common plane spaced from a side of said frame, a cover sheet attached to said side of said frame and to the sides of said intersecting members opposite said flanged portions in said plane, and transverse groups of bars extending along and attached to the flanged portions of said members in said plane and at their ends to the inside surfaces of said frame.

8. A slab comprising a frame, transverse groups of intersecting channels the ends of which are connected to the inside surfaces of said frame and the flanges of which lie in planes one of which lies within the frame and the other of which substantially coincides with the plane of one of the side surfaces of said frame, a cover sheet attached to said side surface of said frame and to the channel flanges in the plane substantially coinciding with the plane of said side surface, and transverse groups of bars attached to the inside surfaces of said frame and extending along and attached to the notched surfaces of said channel flanges in the plane within said frame.

9. A slab comprising a frame, transverse groups of intersecting channels the ends of which are connected to the inside surfaces of said frame and the flanges of which lie in planes one of which lies within the frame and the other of which substantially coincides with the plane of one of the side surfaces of said frame, a cover sheet attached to said side surface of said frame and to the channel flanges in the plane substantially coinciding with the plane of said side surface, and transverse groups of bars attached to the inside surfaces of said frame and extending along and attached to the surfaces of said channel flanges in the plane within said frame.

10. A slab comprising a frame, transverse groups of intersecting channels the ends of which are connected to the inside surfaces of said frame and the flanges of which are in planes one of which lies within said frame and the other of which coincides with one of the side surfaces of said frame, a cover sheet attached to said side surface of said frame and to the channel flanges in the plane coinciding with the plane of said side surface and transverse groups of bars the ends of which are attached to the inside surfaces of said frame and the adjacent sides of which are attached to and separated by the channel flanges in the plane within said frame, one group of bars being disposed along the inside surfaces of the channel flanges extending in one direction and the other group of bars being arranged along the outside surfaces of the channel flanges extending in the transverse direction.

11. A slab comprising spaced beams, cross beams connecting said first-mentioned beams and forming frames one side of each of which is in substantially the same plane as the corresponding sides of said beams, a cellular structure in each of said frames, said structure being formed of transverse groups of intersecting flanged members the ends of which are attached to the inside surfaces of its frame and the flanged portions of which lie in substantially a common plane spaced from the side of its frame which is in substantially the same plane as the corresponding sides of said beams, a cover plate in substantially the same plane as said corresponding sides of said beams attached to the sides of said cellular structures, and transverse groups of bars in each of said frames attached throughout their lengths to the flanged portions of said members in said cellular structures which lie in a plane spaced from the sides of said frames and attached at their ends to the inside surfaces of said frames.

WILLIAM DALTON.